(12) United States Patent
Hong

(10) Patent No.: US 7,374,190 B2
(45) Date of Patent: May 20, 2008

(54) TRICYCLE

(76) Inventor: Jae Hyun Hong, 14065 Stage Rd., Bloomfield Commerce Center, Santa Fe Springs, CA (US) 90670

( * ) Notice: Subject to any disclaimer, the term of this patent is extended or adjusted under 35 U.S.C. 154(b) by 343 days.

(21) Appl. No.: 11/213,175

(22) Filed: Aug. 26, 2005

(65) Prior Publication Data

US 2007/0045983 A1    Mar. 1, 2007

(51) Int. Cl.
*B62K 19/48* (2006.01)
(52) U.S. Cl. ............... 280/282; 280/288.2; 280/288.4; 296/78.1
(58) Field of Classification Search ............... 280/282, 280/288.2, 288.4; 296/78.1
See application file for complete search history.

(56) References Cited

U.S. PATENT DOCUMENTS

| | | | |
|---|---|---|---|
| 4,313,517 A * | 2/1982 | Pivar ........................... | 180/216 |
| 4,325,448 A * | 4/1982 | Pivar ........................... | 180/215 |
| 4,392,536 A * | 7/1983 | Iwai et al. ................... | 180/217 |
| 4,461,609 A * | 7/1984 | Zinno ........................... | 414/495 |
| 5,383,676 A * | 1/1995 | Valentino ..................... | 280/271 |
| 5,499,835 A * | 3/1996 | Skirchak et al. ............. | 280/293 |
| 6,598,927 B2* | 7/2003 | Kurohori et al. ............. | 296/79 |
| D521,431 S * | 5/2006 | Hong .......................... | D12/182 |
| 7,090,279 B2* | 8/2006 | Tahara ........................ | 296/78.1 |
| 7,134,705 B2* | 11/2006 | Larson ........................ | 296/78.1 |

* cited by examiner

*Primary Examiner*—Lesley D. Morris
*Assistant Examiner*—Marlon Arce-Diaz
(74) *Attorney, Agent, or Firm*—John K. Park; Park Law Firm

(57) ABSTRACT

A tricycle includes a windshield and a second attaching device. The windshield has a shell part, a first attaching device at the lower part of the shell part, and the shell part includes a front portion and a rear portion, and the rear portion of the shell part is open. The second attaching device has one or more support beams extended outward from the outer rim substantially on the same plane of the attaching device. The shell part of the windshield is of a streamline shape. The support beams are fixed to the shell part. The windshield further includes a visor part, and the visor part is disposed at the top part of the windshield. The visor part of the windshield is made of plastic and transparent. The tricycle further includes a frame having a triangular truss, a frontal member, a rear wheel support bar, and a handle holder.

16 Claims, 7 Drawing Sheets

TRICYCLE

BACKGROUND OF THE INVENTION

The present invention relates to a tricycle with a windshield and truss. More particularly, this invention relates to a tricycle with a windshield attached to a handle holder by attaching device. Also, the invention relates to a tricycle with a truss which is triangular and doubly fortified to support the load to the tricycle.

The tricycle is something special to almost everyone at one or other period of his/her life. To a little person, it is the very first self-powering and self-controlling vehicle in the long line of the kinds; bicycle, motorcycle, car, and the like.

In a tricycle, there can be a couple of mechanical design concerns, which is closely related to the stubbornness of the structure and an aesthetic consideration. The user may prefer more realistic outlook to just a toy, and the realistic outlook does not come automatically. It may cause additional tight restriction on designing of the parts of the tricycle. Also, the mechanical structure may have to withstand more demanding stress. The strong and light structure is one of the first factors for the safety of the user as in most of the mechanical systems.

Accordingly, a need for a tricycle with a windshield and a truss structure has been present for a long time. This invention is directed to satisfy the long-felt need and solve the related problems.

SUMMARY OF THE INVENTION

The present invention contrives to solve the disadvantages of the prior art.

An objective of the invention is to provide a tricycle with a windshield and truss.

Another objective of the invention is to provide a tricycle with a windshield attached to a handle holder by attaching device.

Still another objective of the invention is to provide a tricycle with a truss which is triangular and doubly fortified to support the load to the tricycle.

A tricycle includes a windshield having a first attaching device, and a second attaching device.

The windshield has a shell part and a first attaching device at the lower part of the shell part. The shell part comprises a front portion and a rear portion, and the rear portion of the shell part is open.

The second attaching device has an attaching body and one or more support beams extended outward from the attaching body. The support beams are disposed substantially on the same plane of the attaching body.

The shell part of the windshield is of a streamline shape.

The support beams of the second attaching device are fixed to the shell part of the windshield.

The windshield can further includes a visor part, which is disposed at the top part of the windshield and made of plastic, wherein the plastic is transparent.

The tricycle further includes a frame having a triangular truss, a frontal member, a rear wheel support bar, and a handle holder having a top end and a bottom end. The handle holder is fixed to the frontal member, and the frontal member is connected to the triangular truss. The triangular truss is connected to the rear wheel support bar, and the two support beams of the windshield are fixed to the inner surface of the shell part of the windshield. The handle holder is substantially cylindrical.

The center of the first attaching device of the windshield is aligned to the central axis of the handle holder of the frame and fitted at the bottom end of the handle holder. The center of the second attaching device is aligned to the central axis of the handle holder of the frame and fitted at the top end of the handle holder.

The frontal member of the frame includes two parallel bars, and each of the two parallel bars is securely fixed to the handle holder.

The triangular truss includes a lower side member and two upper side members, and each of the two upper side members comprises two parallel bars.

The triangular truss further includes a joint bar. The joint bar connects the frontal member, the lower member and the two upper members, and the joint bar meets the frontal member, the lower member and the two upper members substantially perpendicularly.

The lower member and the two upper members are fixed with the rear wheel support bar, and the lower member and the two upper members meets the rear wheel support bar substantially perpendicularly.

The frontal member includes a front bracket. The bracket straddles perpendicularly and fixed to the frontal members, and the front bracket includes two or more holes for fixing the body.

The triangular truss includes a rear bracket on the upper side members, and the rear bracket includes one or more holes for fixing the body.

The tricycle further includes a body covering device over the frame, a T-shaped handle with a horizontal bar and a vertical bar, and a front wheel frame with vertical bar and two wheel-holding arms.

The vertical bar of the T-shaped handle is inserted into and holds in place the handle holder and the first bottom attaching device of the windshield from below. The vertical bar of the front wheel frame is inserted into and holds in place the handle holder and the second attaching device of the windshield from above.

The vertical bar of the T-shaped handle and the vertical bar of the front wheel frame are fixed to each other. The vertical bar of the T-shaped handle and the vertical bar of the front wheel frame are inserted into the handle holder to rotate around the common central axis with a predetermined resistance.

The tricycle further includes a top buffer attaching device, a bottom buffer attaching device, and a handle mounting cap.

The top buffer attaching device is adapted to be fixed on the top end of the handle holder. The bottom buffer attaching device is adapted to be fixed on the bottom end of the handle holder. The handle mounting cap with a central hole and a groove is adapted to cradle the T-shaped handle.

The first attaching device engages slidably with the bottom buffer attaching device and the front wheel frame, and the second attaching device engages slidably with the handle mounting cap and the top buffer attaching device. The rear wheel support bar may include a tail light.

The windshield, body, first and second attaching devices, handle mounting cap, and top and bottom buffer attaching devices are made of plastic.

The frame, rear wheel support bar, front and rear brackets, and vertical bars are made of metal.

The first and second attaching device include circular rings.

The advantages of the present invention are: (1) the tricycle incorporates a windshield to the handle holder part; (2) the windshield of the tricycle makes the tricycle look more realistic; (3) the tricycle has a strong triangular truss to be able to withstand a demanding load.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
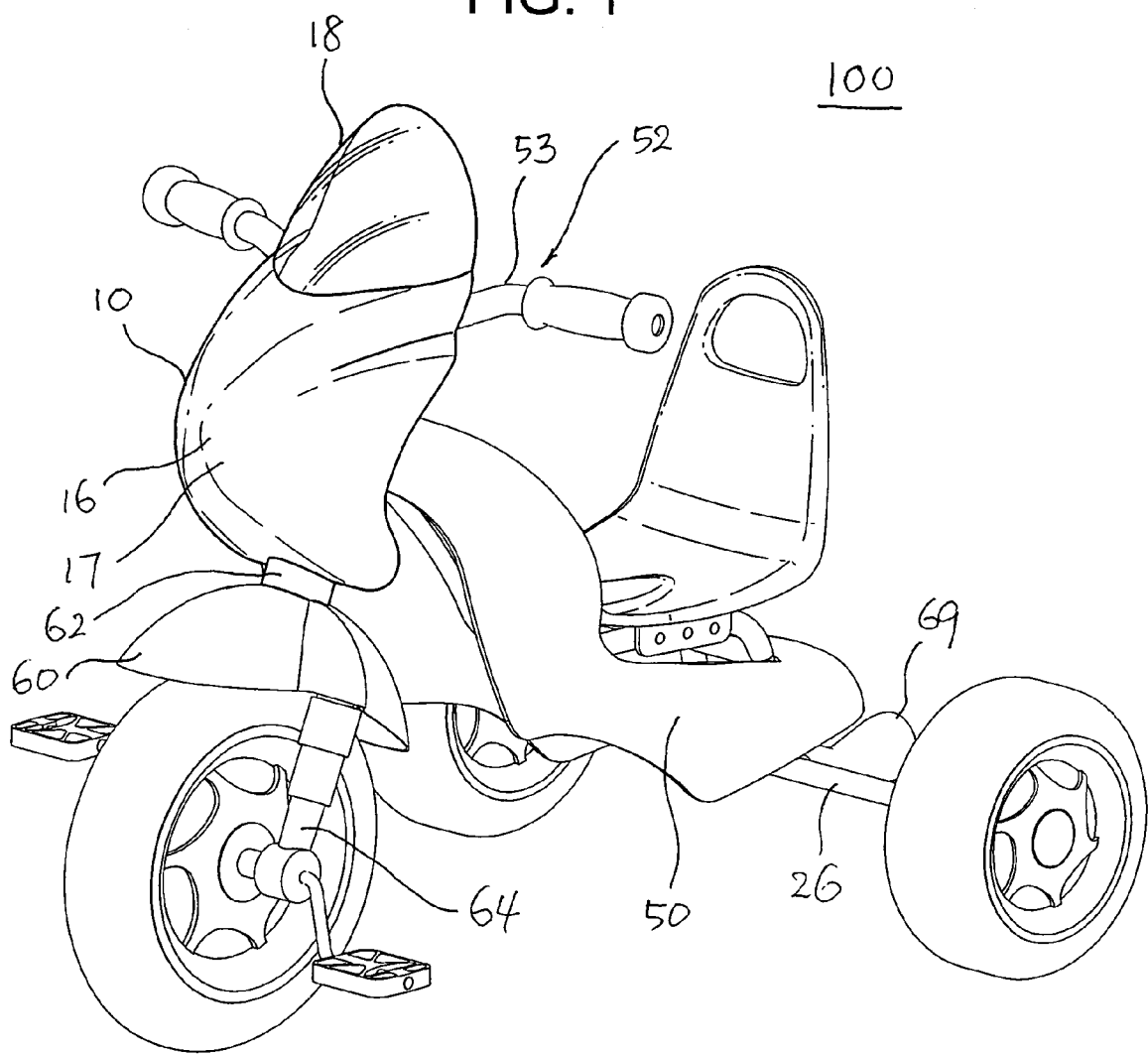
FIG. 1 is a perspective view of a tricycle.
Figure 2:
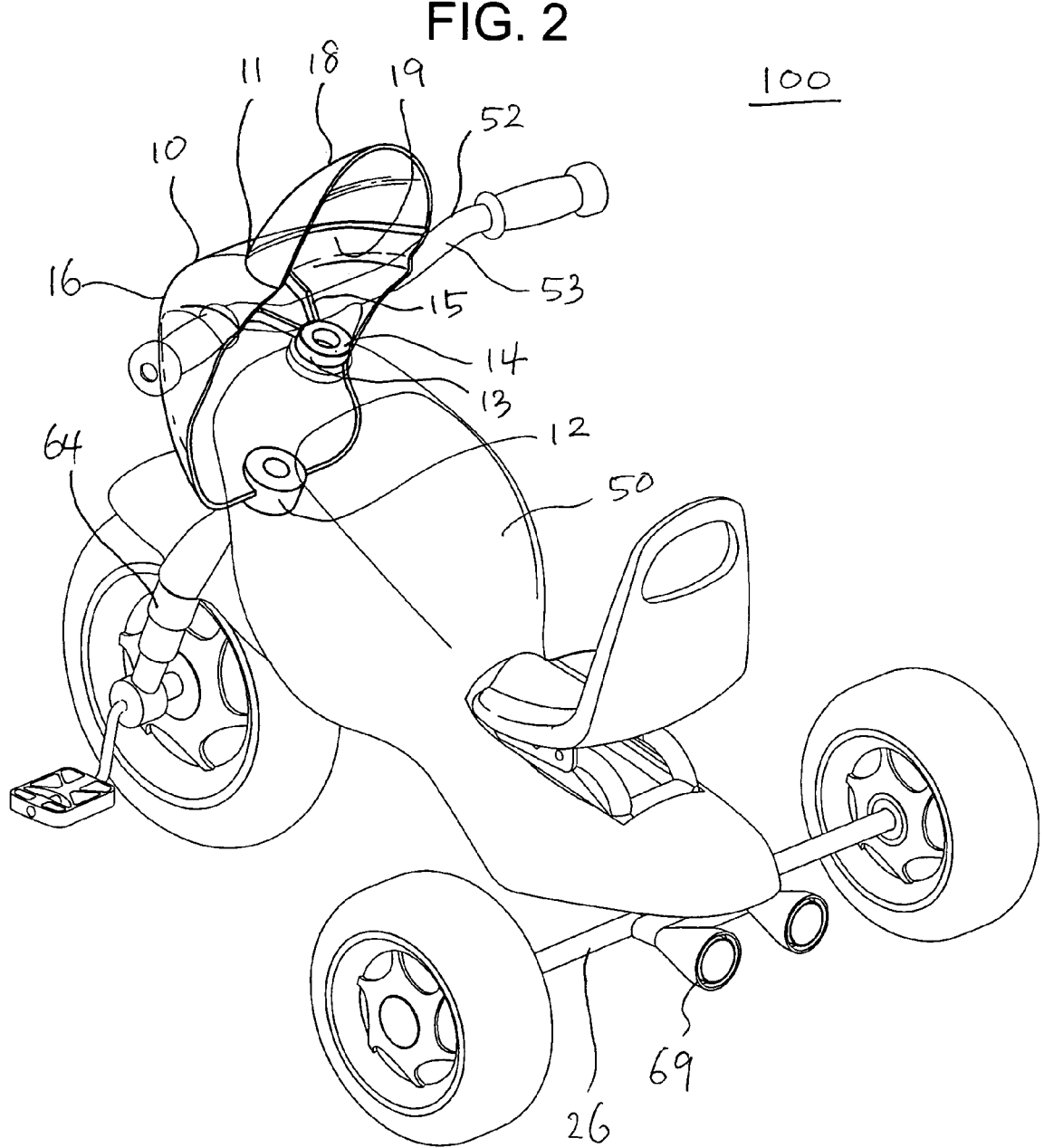
FIG. 2 is another perspective view of the tricycle.
Figure 3:
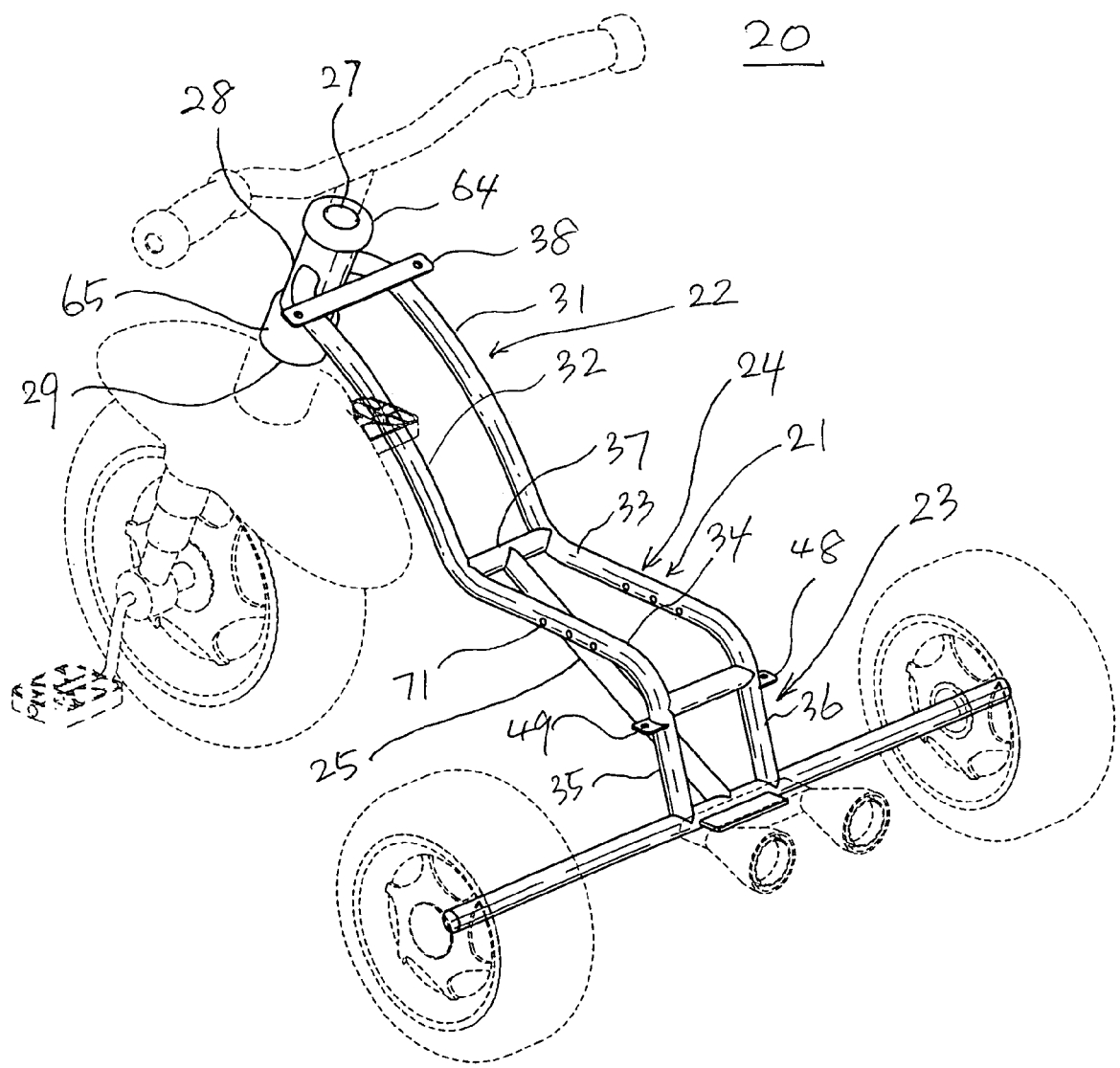
FIG. 3 is a perspective view of a body frame.
Figure 6:
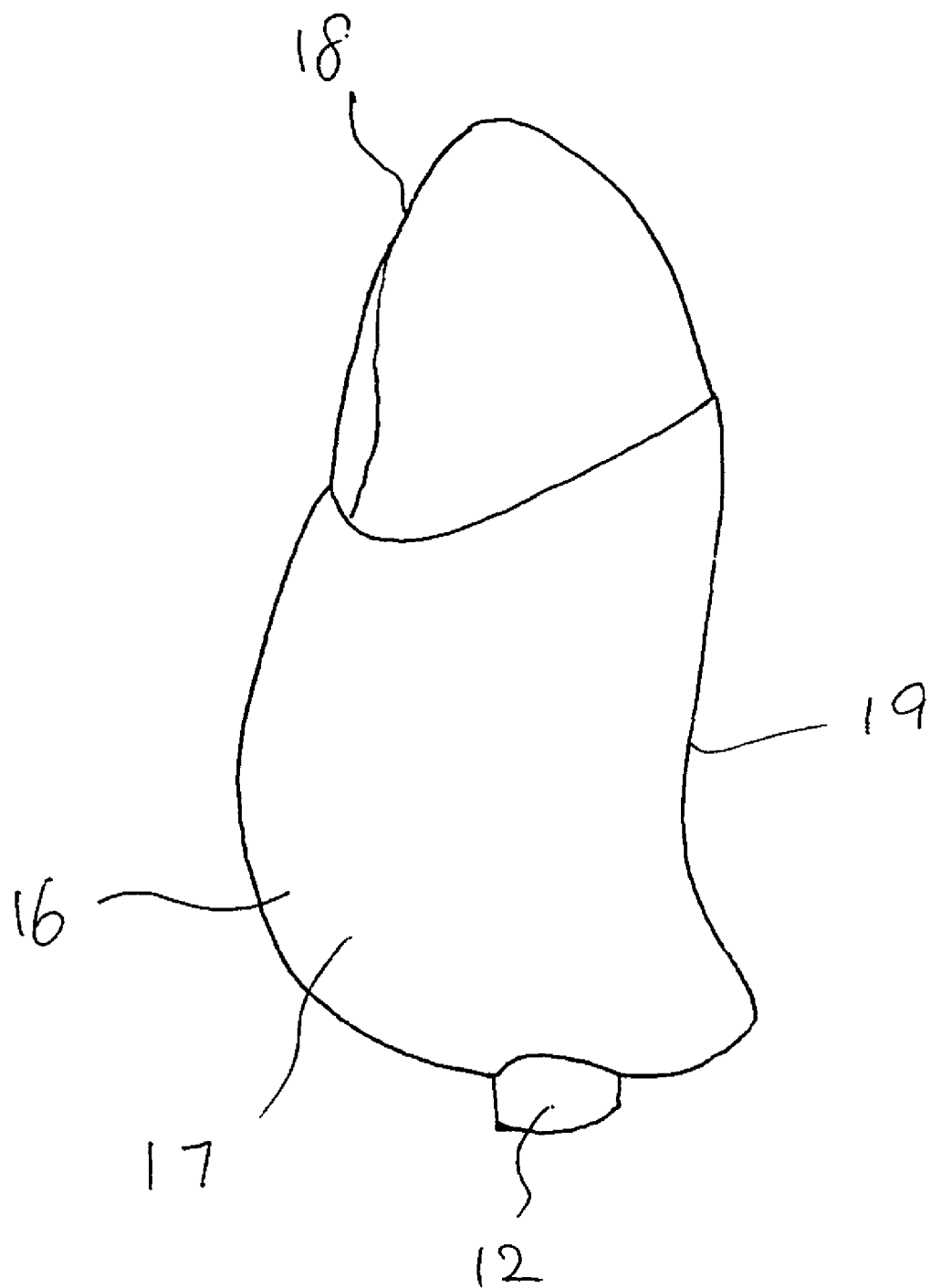
FIG. 6 is a perspective view of a windshield.
Figure 7:
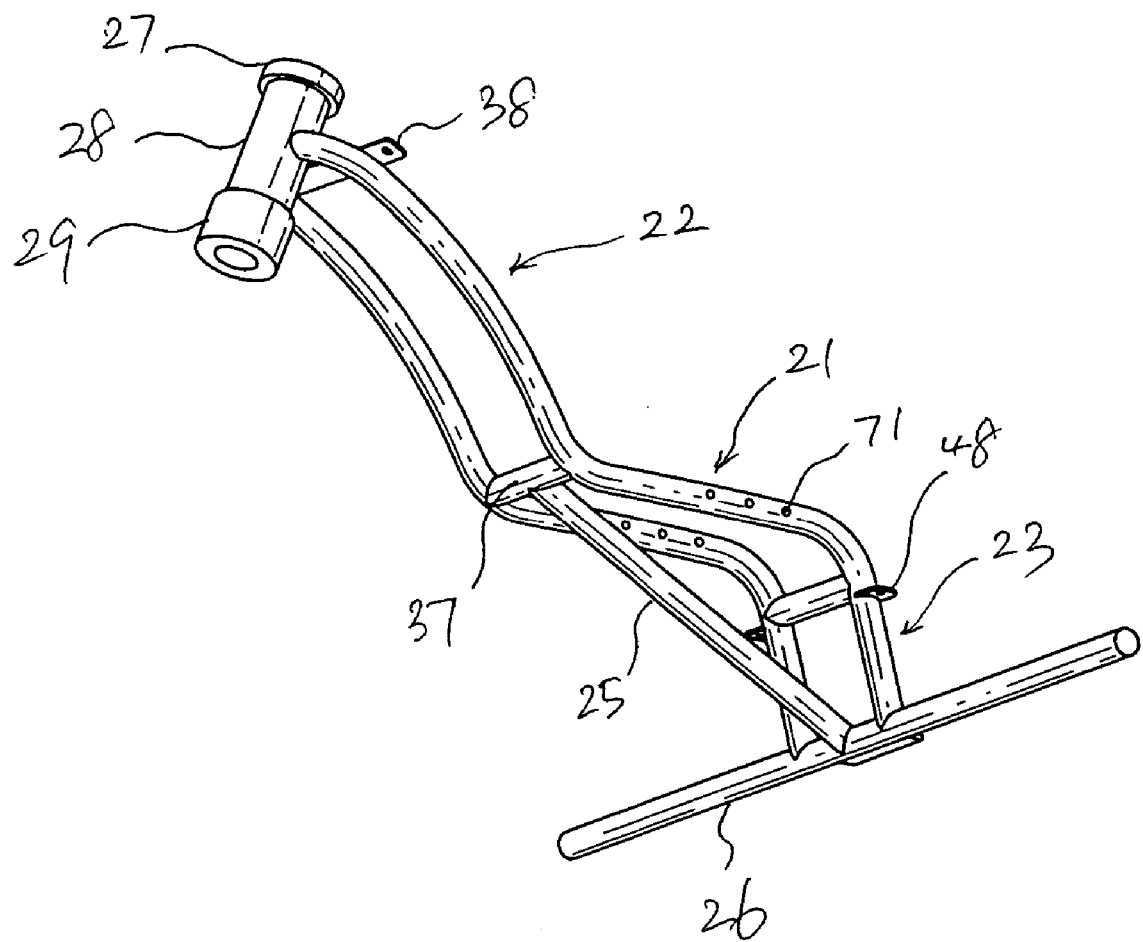
FIG. 7 is a perspective view of the body frame.

FIG. 1 shows a perspective view of a tricycle 100 according to the present invention. FIG. 2 and FIG. 6 show a windshield 10 of the tricycle 100 and FIG. 3 and FIG. 7 show a body frame 20 of the tricycle 100.

The tricycle 100 includes the windshield 10 having a first attaching device 12, and a second attaching device 14.

The windshield 10 further has a shell part 16. The first attaching device 12 is provided at the lower part of the shell part 16. The shell part 16 includes a front portion 17 and a rear portion 19, and the rear portion 19 of the shell part 16 is open.

The second attaching device 14 has an attaching body 13 and one or more support beams 15 extended from the second attaching body 13. The second attaching device 14 and the support beams 15 can be integrated into one.

Preferably, the first attaching device 12 and the second attaching device 14 are integrally molded with the windshield 10.

The shell part 16 of the windshield 10 is of a streamline shape.

The support beams 15 of the second attaching device 14 are fixed to the rear portion 19 of the shell part 16 of the windshield 10.

The windshield 10 further includes a visor part 18, which is disposed at the top part 11 of the windshield 10 and the visor 18 is made of plastic, and the plastic is preferably transparent. The two support beams of the windshield 10 are fixed to the inner surface of the shell part 16 of the windshield 10.

As shown well in FIG. 3, the frame 20 of the tricycle 100 has a triangular truss 24, a frontal member 22, a rear wheel support bar 26, and a handle holder 28 having a top end 27 and a bottom end 29. The handle holder 28 is fixed to the frontal member 22, and the frontal member 22 is connected to the triangular truss 24. The triangular truss 24 is connected to the rear wheel support bar 26. The handle holder 28 is substantially cylindrical.

The center of the first attaching device 12 of the windshield 10 is aligned to the central axis of the handle holder 28 of the frame 20 and fitted at the bottom end 29 of the handle holder 28. The center of the second attaching device 14 is aligned to the central axis of the handle holder 28 of the frame 20 and fitted at the top end 27 of the handle holder 28.

The frontal member 22 of the frame 20 includes two parallel bars 31, 32, and each of the two parallel bars 31, 32 is securely fixed to the handle holder 28.

The triangular truss 24 includes a lower side member 25, a first upper side member 21 and the second upper side members 23, and each of the two upper side members 21, 23 includes two parallel members 33, 34 and 35, 36 respectively. Each of the two parallel bars 33, 34 of the first upper side member 21 includes a plurality of holes, and each of the parallel bars 35, 36 of the second upper side member 23 includes a rear bracket 48 with a hole 49.

The triangular truss 20 further includes a joint bar 37. The joint bar 37 connects the frontal member 22, the lower member 25 and the two upper members 21, 23, and the joint bar 37 meets the frontal member 22, the lower member 25 and the upper member 21 substantially perpendicularly.

The lower member 25 and the two upper members 21, 23 are fixed with the rear wheel support bar 26, and the lower member 25 and the two upper members 21, 23 meets the rear wheel support bar 26 substantially perpendicularly.

The frontal member 22 includes a front bracket 38. The bracket 38 straddles perpendicularly and fixed to the frontal members 22, and the front bracket 38 includes two or more holes 39 for fixing the body 50.

The triangular truss 24 includes a rear bracket 48 on each of the upper side members 21, 23, and the rear bracket 48 includes one or more holes 49 for fixing the body 50.

The tricycle 100 further includes a body 50 covering device over the frame 20, a T-shaped handle 52 with a horizontal bar 53 and a vertical bar 54, and a front wheel frame 60 with vertical bar 62 and two wheel-holding arms 64.

The vertical bar 54 of the T-shaped handle 52 is inserted into and holds in place the handle holder 28 and the first bottom attaching device 12 of the windshield 10 from below. The vertical bar 62 of the front wheel frame 60 is inserted into and holds in place the handle holder 28 and the second attaching device 14 of the windshield 10 from above.

The vertical bar 54 of the T-shaped handle 52 and the vertical bar 62 of the front wheel frame 60 are fixed to each other. The vertical bar 54 of the T-shaped handle 52 and the vertical bar 62 of the front wheel frame 60 are inserted into the handle holder 28 to rotate around the common central axis with a predetermined resistance.

Figure 4:
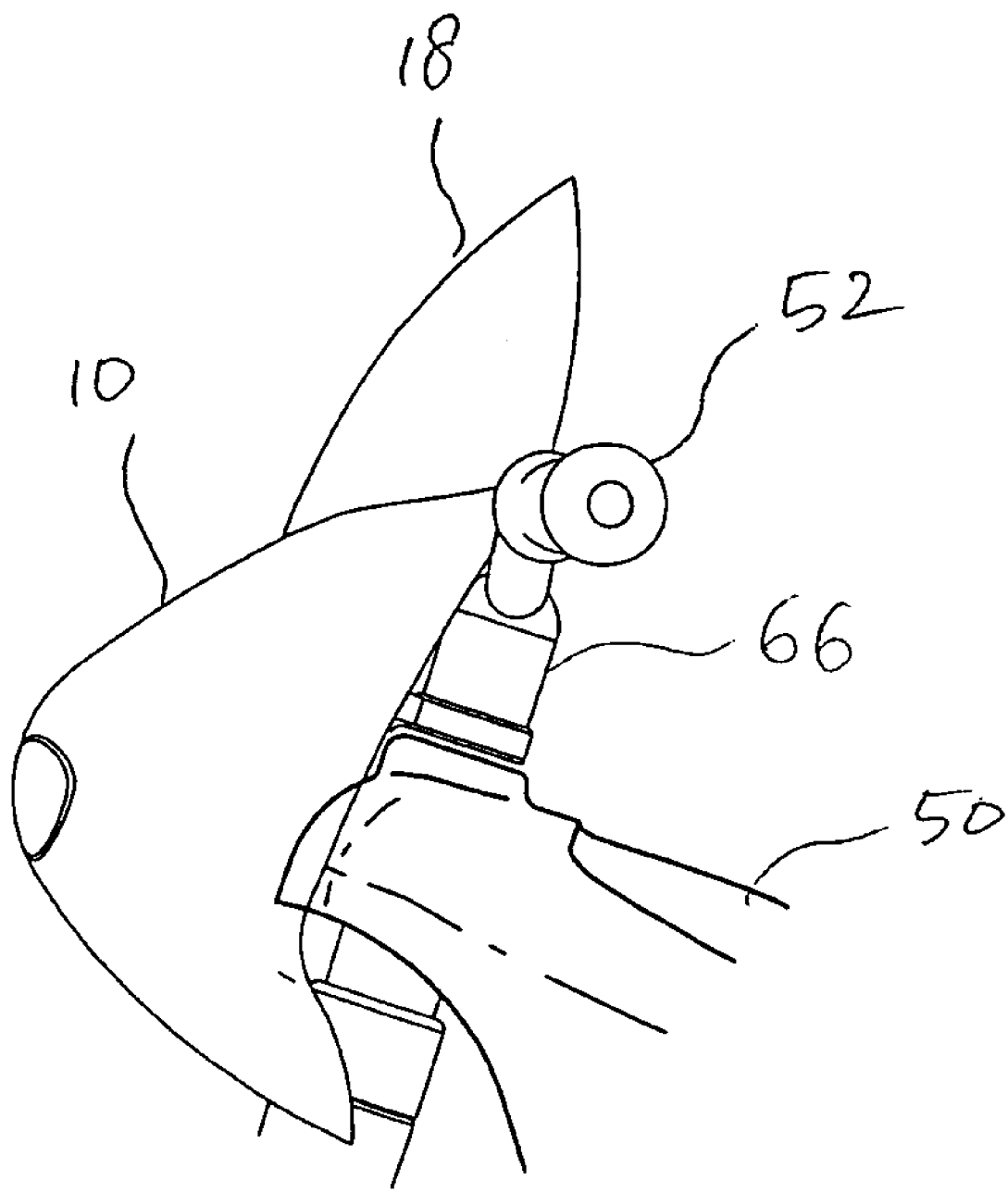
FIG. 4 is a side view of a handle mounting cap.
Figure 5:
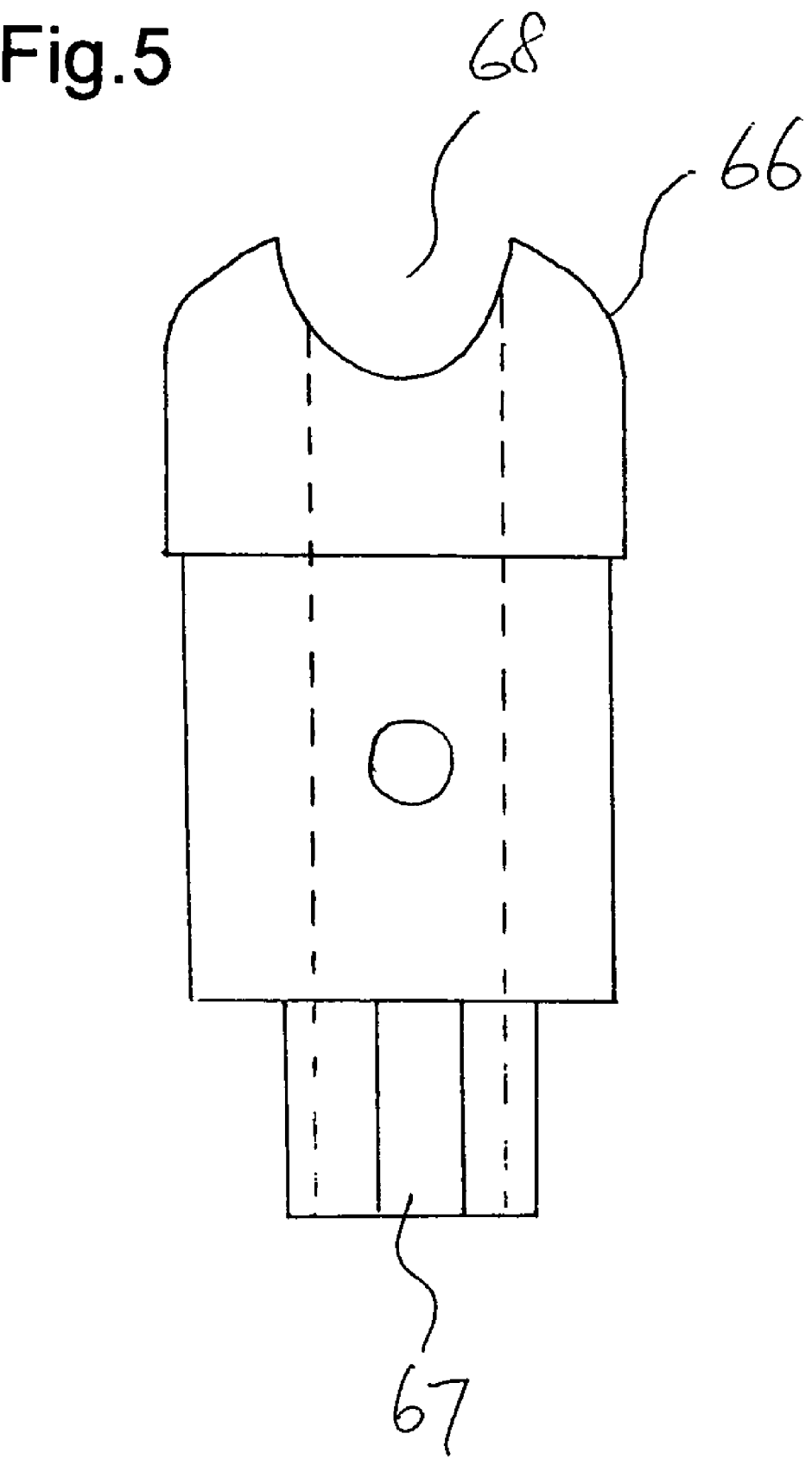
FIG. 5 is a side view of a handle mounting cap mounted on the tricycle.

The tricycle 100 further includes a top buffer attaching device 64, a bottom buffer attaching device 65, and a handle mounting cap 66 as shown in FIG. 4 and FIG. 5.

The top buffer attaching device 64 is adapted to be fixed on the top end 27 of the handle holder 28. The bottom buffer attaching device 65 is adapted to be fixed on the bottom end 29 of the handle holder 28. The handle mounting cap 66 with a central hole 67 and a groove 68 is adapted to cradle the T-shaped handle 52.

The first attaching device 12 engages slidably with the bottom buffer attaching device 65 and the front wheel frame. 60, and the second attaching device 14 engages slidably with the handle mounting cap 66 and the top buffer attaching device 64. The rear wheel support bar 26 may include a tail light 69.

The windshield 10, body 50, first and second attaching devices 12, 14, handle mounting cap 66, and top and bottom buffer attaching devices 64, 65 are made of plastic.

The frame 20, rear wheel support bar 26, front and rear brackets 38, 48, and vertical bars 54, 62 are made of metal.

The first and second attaching devices 12, 14 include circular rings.

FIG. 5 shows a side view of the front part of the tricycle 100.

FIG. 6 shows a perspective view of the windshield 10, and FIG. 7 shows a perspective view of the frame 20.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A tricycle comprising:
   a frame;
   a windshield having a shell part, wherein the shell part comprises a front portion and a rear portion, wherein the rear portion of the shell part is open;
   a first attaching device for attaching the windshield to the frame; and
   a second attaching device for attaching the windshield to the frame comprising an attaching body and one or more support beams extended outward from the attaching device,
   wherein the frame comprising a triangular truss, a frontal member, a rear wheel support bar, and a handle holder having a top end and a bottom end, wherein the handle holder is fixed to the frontal member, when the frontal member is connected to the triangular truss,
   wherein the handle holder is substantially cylindrical, and
   wherein the center of the first attaching device of the windshield is aligned to the center of the handle holder of the frame and fitted at the bottom end of the handle holder, wherein the center of the second attaching device is aligned to the central axis of the handle holder of the frame and fitted at the top end of the handle holder.

2. The tricycle of claim 1, wherein the frontal member of the frame comprises two parallel front bars, wherein each of the two parallel front bars is securely fixed to the handle holder.

3. The tricycle of claim 1, wherein the triangular truss comprises a lower side member, a first upper side member, and a second upper side member, wherein each of the two upper side members comprises two parallel bars, wherein each of the two parallel bars of the first upper side member comprises a plurality of holes, wherein each of the parallel bars of the second upper side member comprises a flange with a hole.

4. The tricycle of claim 3, wherein the triangular truss further comprises a joint bar, wherein the joint bar connects the two front bars, the lower member and the two upper members, wherein the joint bar meets the two frontal members, the lower member and the first upper member substantially perpendicularly.

5. The tricycle of claim 3, wherein the lower member and the two upper members are fixed to the rear wheel support bar, wherein the lower member and the two upper members meet the rear wheel support bar substantially perpendicularly.

6. The tricycle of claim 5, wherein the frontal member comprises a front bracket, wherein the bracket straddles perpendicularly and fixed to the frontal members, wherein the front bracket comprises two or more holes for fixing the body.

7. The tricycle of claim 5, wherein the triangular truss comprises a rear bracket on each of the upper side members, wherein the rear bracket comprises one or more holes for fixing the body.

8. The tricycle of claim 1, further comprising:
   a) a body covering device over the frame;
   b) a T-shaped handle with a horizontal bar and a vertical bar; and
   c) a front wheel frame with vertical bar and two wheel-holding arms,
   wherein the vertical bar of the T-shaped handle is inserted into and holds in place the handle holder and the first bottom attaching device of the windshield from below, wherein the vertical bar of the front wheel frame is inserted into and holds in place the handle holder and the second attaching device of the windshield from above.

9. The tricycle of claim 8, wherein the vertical bar of the T-shaped handle and the vertical bar of the front wheel frame are fixed to each other, wherein the vertical bar of the T-shaped handle and the vertical bar of the front wheel frame are inserted into the handle holder to rotate around the common central axis with a predetermined resistance.

10. The tricycle of claim 8, further comprising:
    a) a top buffer attaching device adapted to be fixed on the top end of the handle holder;
    b) a bottom buffer attaching device adapted to be fixed on the bottom end of the handle holder; and
    c) a handle mounting cap with a central hole and a groove adapted to cradle the T-shaped handle, wherein the first attaching device engages slidably with the bottom buffer attaching device and the front wheel frame, wherein the second attaching device engages slidably with the handle mounting cap and the top buffer attaching device.

11. The tricycle of claim 10, wherein the rear wheel support bar comprises a tail light.

12. The tricycle of claim 1, wherein the first attaching device comprises a circular ring.

13. The tricycle of claim 1, wherein the second attaching device comprises a circular ring.

14. The tricycle of claim 1, wherein the second attaching device is disposed substantially on the same plane of the second attaching body.

15. The tricycle of claim 1, wherein the first attaching device is provided at the lower part of the shell part, wherein the second attaching device is provided at the upper part of the shell part, and wherein the shell part of the windshield is of a streamline shape.

16. The tricycle of claim 1, wherein the support beams of the second attaching device are fixed to the shell part of the windshield, wherein the windshield further comprises a visor part, wherein the visor part is disposed at the upper part of the windshield, and wherein the visor part of the windshield is made of plastic, wherein the plastic is transparent.

* * * * *